United States Patent [19]
Baird et al.

[11] 3,878,029
[45] Apr. 15, 1975

[54] COMPACT MULTISTAGE WIPED-FILM EVAPORATOR APPARATUS

[75] Inventors: James L. Baird, Winchester; Max Mendelsohn, Randolph, both of Mass.

[73] Assignee: Artisan Industries Inc., Waltham, Mass.

[22] Filed: Nov. 26, 1973

[21] Appl. No.: 418,867

[52] U.S. Cl............. 159/6 WH; 159/14; 159/17 VS; 159/49
[51] Int. Cl........................... B01d 1/22; B01d 1/26
[58] Field of Search.... 159/13 R, 13 A, 27 R, 27 A, 159/17 C, 20 R, 17 VS, 14, 6 R, 6 W; 202/236, 189, 185; 203/89

[56] References Cited
UNITED STATES PATENTS

| | | | |
|---|---|---|---|
| 2,544,138 | 5/1951 | Cross | 159/6 R |
| 2,703,610 | 3/1955 | Cross | 159/13 A X |
| 3,223,144 | 12/1965 | Dedert | 159/17 C X |
| 3,291,703 | 12/1966 | Dvonch et al. | 202/185 X |
| 3,521,691 | 7/1970 | Donovan | 159/6 WH |
| 3,587,704 | 6/1971 | Monty | 159/6 WH |
| 3,716,458 | 2/1973 | Greenfield | 159/13 A X |

FOREIGN PATENTS OR APPLICATIONS

| | | | |
|---|---|---|---|
| 1,554,189 | 1/1969 | France | 159/6 WH |

*Primary Examiner*—Jack Sofer
*Attorney, Agent, or Firm*—Richard P. Crowley

[57] ABSTRACT

A compact multistage evaporator apparatus and method characterized by a low pressure drop comprising a common vapor chamber; a first and second-stage rising-film evaporator and a thin wiped-film evaporator, the vapor streams of all the evaporators discharged directly into the common vapor chamber; and condensing means within the vapor chamber to provide a condensate distillate product.

15 Claims, 2 Drawing Figures

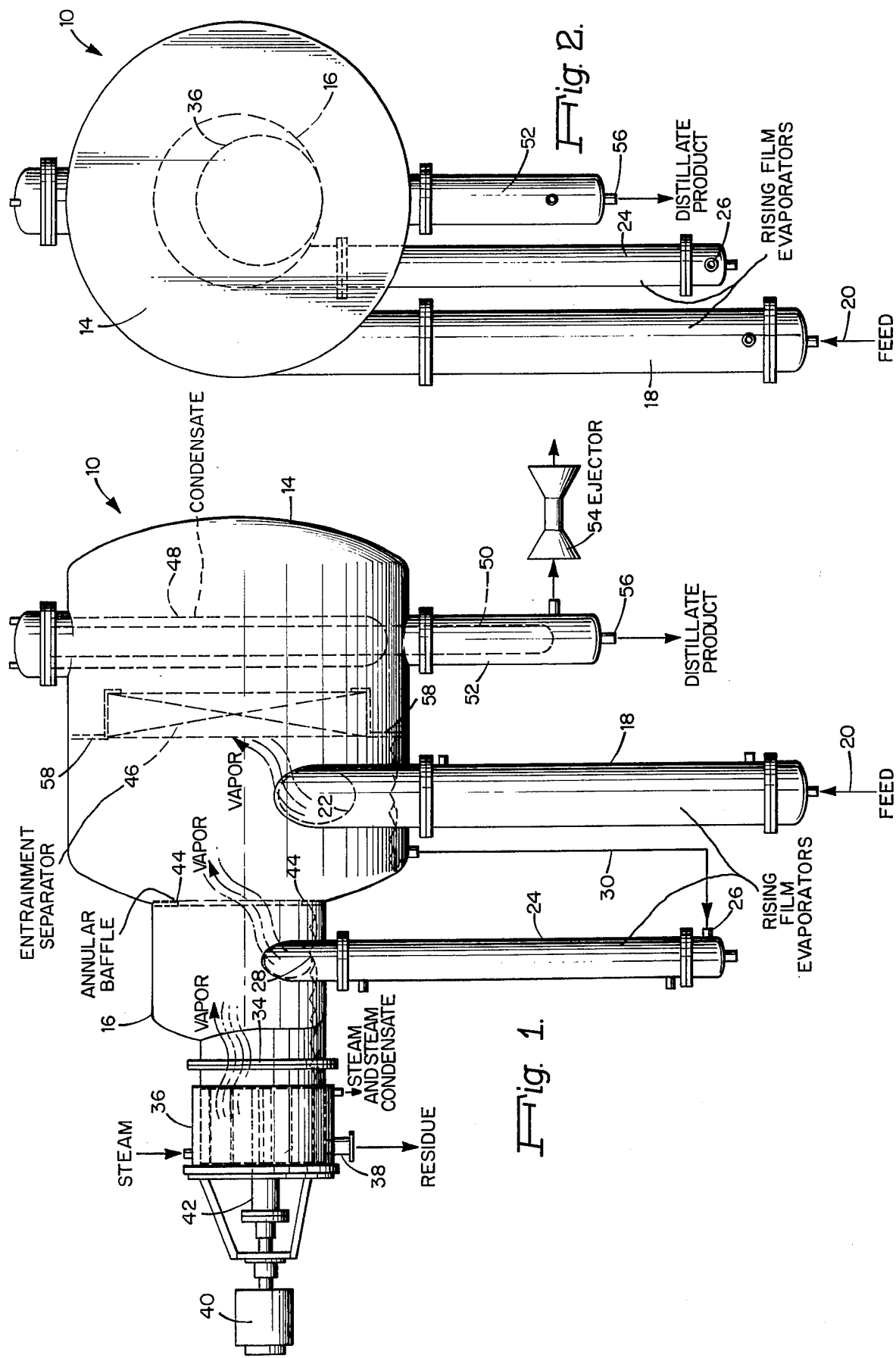

COMPACT MULTISTAGE WIPED-FILM EVAPORATOR APPARATUS

BACKGROUND OF THE INVENTION

It is often desirable to subject a liquid feed stream to several distillation or evaporative steps in order to obtain the separation of the feed stream into its various components and to obtain a condensate distillate of the desired purity and composition. Such distillation and evaporative steps may include one or more passes through a thin-film-type evaporator, alone or in combination with a wiped thin-film evaporator. Typical multistage distillation and evaporation systems are described, for example, in U.S. Pat. No. 3,449,216 issued June 10, 1969 and U.S. Pat. No. 3,521,691 issued July 28, 1970. Such multistage systems are satisfactory for a large number of processes, but have certain inherent costs and operating disadvantages associated with the number of vapor lines employed in the apparatus, with the attendant large pressure drop occasioned by such vapor lines. It is, thus, desirable to provide for a more compact and efficient multistage evaporator system, which system would be characterized by a reduction in the vapor pressure drop in vacuum distillations.

SUMMARY OF THE INVENTION

Our invention concerns a compact multistage evaporator apparatus and system which eliminates many of the vapor lines associated with past multistage systems, and provides for a reduction in the pressure drop in such apparatus. In particular, our compact multistage evaporator apparatus comprises a combination of at least first and second-stage vertical thin-film evaporators, a common vapor body and a mechanical thin-film or wiped-film evaporator arranged to provide an efficient, compact, low-pressure evaporation system. More particularly, our invention concerns a compact multistage evaporator apparatus having a reduction in the number of vapor lines between the various evaporators, and wherein the arrangement and configuration of the vapor body and mechanically aided thin-film evaporator is such that there is little or no change in the direction of vapor between the thin-film evaporators and the common vapor chamber, so as to reduce considerably the pressure drop in the system.

BRIEF DESCRIPTION OF THE DRAWINGS

FIG. 1 is a schematic elevation view of our compact multistage evaporator apparatus.

FIG. 2 is an end view of the multistage compact apparatus of FIG. 1 looking in the westerly direction.

DESCRIPTION OF THE EMBODIMENTS

FIGS. 1 and 2 show our compact multistage evaporator apparatus 10 which comprises generally cylindrical and horizontal vapor chamber 12 comprising a first cylindrical section 14 and an adjoining second cylindrical section 16, the first section having a greater diameter than said second section, the first and second sections 14 and 16 horizontally and coaxially aligned. A first-stage, vertical, rising film evaporator 18 contains a feed inlet 20 for the introduction of a liquid feed stream to be distilled in the apparatus, and an outlet 22 at the upper end of the evaporator 18, the vapor outlet discharging tangentially and directly into the interior of the first section 14 of the vapor chamber. The apparatus includes a second-stage vertical, rising film evaporator 24 having a feed inlet 26 which is fed by product line 30, and a second-stage outlet 28 which discharges tangentially and directly into the second section 16 of the vapor chamber. Adjoining the vapor chamber 12 and generally horizontally aligned therewith is a horizontally axised, mechanically aided, cylindrical, wiped-film evaporator 32, one end of which is open and constitutes a liquid feed inlet 34, and is secured directly to and eccentrically aligned with the second section 16 of the vapor chamber. The evaporator 32 contains a steam-jacketed process shell 36, an outlet for product or residue at one end 38, a motor 40 for rotation of the rotor blades therein, and a bearing assembly 42 for the rotor blades. As illustrated, the evaporator 32 is a countercurrent-flow evaporator with the liquid feed stream moving in one direction countercurrent to the movement of the vapor stream. Typical thin-film evaporators which may be employed include the thin-film evaporators as described in U.S. Pat. No. 2,927,634 issued Mar. 8, 1960 and U.S. Pat. No. 3,348,600 issued Oct. 24, 1967.

Positioned between the vapor chamber sections 14 and 16 is a ring-like baffle 44 to prevent the combining of the liquid stream discharged from outlets 22 and 28 of the first 18 and second 24 stage evaporators. Within the larger vapor body section 14 is positioned an entrainment separator 46, for example, a wire or mesh-type separator, which prevents the passage of liquid droplets in the vapor stream in the vapor chamber, the separator 46 positioned on supports 58. A condenser cooler 48 is positioned within the vapor chamber 14, with an extension of the elongated condenser 50 positioned within a product outlet 52 of the vapor chamber, which product outlet contains a distillate discharge 56 for the recovery of the desired distillate product. The compact multistage apparatus is placed under subatmospheric pressure through the use of a vacuum means 54, such as a vacuum pump or a jet eductor.

As illustrated, our compact multistage evaporator system eliminates many of the vapor and other lines associated with past multistage systems, resulting in a more efficient and compact apparatus and in a reduction in the pressure drop when the evaporator apparatus is employed in subatmospheric distillation and evaporative processes. In particular, the open end of the mechanically aided thin or wiped-film evaporator is directly aligned with the vapor chamber 12 so as to eliminate any change in direction of the vapor stream as it exists from the wiped film evaporator 32 into the vapor chamber 12; thus, reducing pressure drop often attended with changes in direction of vapor streams.

Our compact multistage evaporator apparatus may be usefully employed in many multistage evaporator processes, such as, for example, the low-pressure evaporator processes which include, but are not limited to: the recovery of usable hydrocarbon lubricating oils from used lubricating oil, thereby providing for the removal of tars, decomposition products and tramp oils and the like from the used lubricating oil, and the recovery of a reusable distillate lubricating oil; the recovery of monomers or other products from reaction mixtures, such as, for example, the recovery of bis phenol A distillate from reaction mixtures in which the bis phenol A is produced; and the recovery of purified fatty acids and alcohols from reaction and other mixtures containing such acids and alcohols.

In the operation of a process employing our compact multistage evaporator apparatus, a liquid stream, for example, a used hydrocarbon lube oil, is introduced into the first-stage evaporator feed inlet 20 and a first vapor and a first liquid stream discharged from outlet 22 directly into the interior of the vapor body 12 first section 14. The first liquid stream is then recycled through line 30 to the inlet 26 of the second-stage evaporator 24, and a second vapor stream and a second liquid stream discharged directly from product outlet 28 into the interior of the second section 16 of the vapor chamber 12. The ring-like baffle 44 prevents the second liquid stream from comingling with the liquid stream of the first liquid stream in the vapor body. Any baffle means to accomplish this purpose may be employed, such as lower crescent-type baffles; however, as illustrated, a ring-like projection 44 is shown about the entire circumferential adjoinment area of the vapor bodies 14 and 16, since often the liquid stream is discharged with such force from discharge outlet 28 that a single lower baffle means may not be sufficient.

The second liquid stream then flows into the feed inlet 34 of the wiped-film evaporator 32, the evaporator providing for a vapor stream which flows directly from the evaporator 32 back into the second 16 and first 14 sections of the vapor body 12. The thin-film evaporator 32 is steam-jacketed with a plurality of rotor blades; e.g., four or six, providing for a wiped thin film of the liquid stream onto the interior walls of the process shell 36, and the discharge of a residue; e.g., a high boiling-point hydrocarbon residue, from the outlet 38. Where control of the residence time of the liquid stream in the evaporator 32 is desired, a thin-film evaporator employing projections on the rotor blades or a tapered-type evaporator may be used.

The vapor streams from the first-stage, second-stage evaporators and the wiped-film evaporator comprise a total vapor stream which passes through the entrainment separator 46, whereby fine liquid droplets suspended in the total vapor stream are entrained and removed, the liquid droplets added to the first liquid stream and being recycled through lines 30 to the second-stage evaporator. The outlets 22 and 28 of the first stage evaporators 18 and second stage evaporators 24 are positioned slightly above the lower level of the respective vapor chambers 14 and 16. The total vapor stream is placed into contact with the condenser/cooler 48 which, for the purposes of efficiency, is not located within the vapor body, but may be extended into the product outlet 52. A distillate condensate product, such as a reusable hydrocarbon lube oil of desired boiling point ranges, such as 425° to 600°F, is removed from the outlet 56. The multistage evaporator system is maintained under a subatmospheric pressure in operation, such as, for example, 0.1 to 100 mm; for example, 1.0 to 20 mm pressure, by the vacuum means 54.

Our multistage compact evaporator apparatus has been described for the purposes of illustration only employing a vapor chamber having two sections of different diameter. However, if desired, the vapor chamber may be of a single large diameter with baffle means to prevent the comingling of the liquid streams of the multistage thin-film vertical evaporators. In addition, our apparatus has been described with the use of first and second-stage, vertical, rising-film evaporators; however, it is recognized that a number of similar or different evaporators; e.g., falling film, may be so employed as desired and as required for the processing of the liquid stream. Further, when employing a large cylindrical total vapor chamber, the thin-film mechanically aided evaporator need not be horizontally aligned with the horizontal axis of the vapor chamber, provided that the vapor from the mechanically aided wiped film evaporator may be directly discharged into the vapor chamber. Therefore, for example, the mechanically aided wiped film evaporator in other embodiments may be positioned directly adjoining the vapor chamber, but not horizontally aligned with the axis thereof. Other modifications and changes in our compact multistage evaporator will be apparent to those persons skilled in the art.

We claim:

1. A multistage wiped-film evaporator apparatus which comprises in combination:

a. a vapor chamber having a distillate condensate product outlet;

b. a first-stage, vertical thin-film evaporator having an upstream end and a downstream end, wherein a liquid feed stream to be distilled is introduced into the upstream end, and wherein a first vapor stream and a first liquid stream are discharged from the downstream end directly into the interior of the vapor chamber;

c. a second-stage, vertical thin-film evaporator having an upstream end and a downstream end, and wherein at least a portion of the first liquid stream from the interior of the vapor chamber is directed into the upstream end of the second-stage evaporator, and wherein a second vapor stream and a second liquid stream are discharged from the downstream end of the second-stage evaporator directly into the interior of the vapor chamber;

d. means to introduce the first liquid stream in the interior of the vapor chamber to the upstream end of the second-stage evaporator;

e. baffle means within the vapor chamber to prevent the first and second liquid streams discharged from the first and second-stage evaporators from comingling within the vapor chamber, but permitting the comingling of the first and second vapor streams in the vapor chamber;

f. a generally horizontally axised, mechanically aided, thin wiped-film evaporator having a plurality of rotating rotor blades therein within a process shell, the evaporator having a downstream residue discharge outlet and an upstream liquid feed inlet, the liquid feed inlet positioned directly adjacent the vapor chamber, wherein the second liquid stream from the vapor chamber is introduced directly into the upstream liquid feed end of the wiped thin-film evaporator, wherein the vapor stream from the wiped thin-film evaporator is discharged directly back into the interior of the vapor chamber, and wherein a residue stream is discharged from the outlet of the wiped thin-film evaporator, the vapor stream of the wiped thin-film evaporator and the vapor stream of the first and second stage evaporators comprising a total vapor stream moving counterflow to the direction of the liquid in the vapor chamber and essentially rectilinearly within the vapor chamber;

g. a condensing means within the vapor chamber and at the downstream end thereof with respect to vapor flow to condense at least a portion of the total vapor stream to provide a distillate condensate product at the downstream end of the vapor chamber; and h. vacuum means to provide a subatmospheric pressure within the multistage evaporator apparatus.

2. The multistage evaporator apparatus of claim 1 wherein the condensing means includes an elongated condenser which extends within the vapor chamber and at least partially into the distillate condensate product outlet.

3. The multistage evaporator apparatus of claim 1 wherein the baffle means comprises a ring-like baffle projection extending circumferentially about the interior wall of the vapor chamber between the contiguous ends of the first and second-stage evaporators.

4. The multistage evaporator apparatus of claim 1 which includes an entrainment separator means extending across the vapor chamber immediately upstream of the condensing means with respect to vapor flow to provide for removal of liquid droplets from the total vapor stream prior to condensation.

5. The multistage evaporator apparatus of claim 1 wherein the horizontal axis of the vapor chamber and the wiped film evaporator are substantially aligned so that the vapor stream from the wiped film evaporator is discharged directly from the liquid upstream end thereof into the interior of the vapor chamber without a change in a direction of the vapor stream from the thin-film evaporator.

6. The multistage evaporator apparatus of claim 1 wherein the first and second-stage vertical film evaporators are rising-film evaporators, and wherein the ends of each of the first and second-stage evaporators are positioned slightly above the lower interior wall of the vapor chamber to admit the films tangentially thereto.

7. The multistage evaporator apparatus of claim 1 wherein the vapor chamber comprises a first and second cylindrical section, the first section having a greater interior diameter than the second section, the axis of the first and second sections and the horizontal axis of the thin-film evaporator substantially in alignment, the downstream end of the first-stage evaporator discharging directly into the first section, and the downstream end of the second-stage evaporator discharging into the second section.

8. The multistage evaporator apparatus of claim 7 wherein the mechanically aided wiped thin-film evaporator comprises a cylindrical process shell containing a plurality of rotor blades therein, one end of the cylindrical process shell being the upstream liquid feed end and directly secured to the second section of the vapor chamber, whereby the second liquid stream from the second-stage evaporator is introduced into the upstream liquid feed end of the wiped thin-film evaporator, and vapor from the wiped thin-film evaporator passes from the said feed end into the second section of the vapor chamber.

9. The multistage evaporator apparatus of claim 7 wherein a ring-like baffle is positioned substantially along the transverse plane of adjoinment between the first and second sections of the vapor chamber to prevent the comingling of the first and second liquid streams of the first and second-stage evaporators.

10. A multistage film evaporator apparatus which comprises in combination:

a. a generally cylindrical, horizontally axised vapor chamber, the vapor chamber characterized by a first cylindrical section and a second cylindrical section, the first section having a greater interior diameter than the second section, and the first section of the vapor chamber containing distillate outlet for the withdrawal of condensate distillate from the interior of the chamber;

b. a first-stage, vertical, rising-film evaporator having an upstream lower end and a downstream upper end, the downstream end positioned above the lower wall of the vapor chamber and discharging liquid and vapor tangentially and directly into the lower part of the first section of the vapor chamber, whereby a liquid feed stream to be distilled under vacuum is introduced into the upstream lower end, and a first vapor stream and a first liquid stream discharged from the downstream upper end of the first-stage evaporator directly and tangentially into the interior of the first section of the vapor chamber;

c. a second-stage, vertical, rising-film evaporator having an upstream lower and a downstream upper end, the upper downstream end positioned above the lower wall of the vapor chamber and adapted to discharge liquid and vapor tangentially and directly into the lower part of the second section of the interior of the vapor chamber, and whereby the first liquid stream from the vapor chamber is directed into the upstream end of the second-stage evaporator, and a second vapor stream and a second liquid stream discharged from the downstream upper end of the second-stage evaporator directly and tangentially into the interior of the second section of the vapor chamber;

d. means to provide for the introduction from the interior of the first section of the vapor chamber of the first liquid stream to the upstream lower end of the second-stage evaporator;

e. a ring-like baffle means between the first and second sections of the vapor chamber to prevent the comingling of the first and second liquid streams, but which permits the comingling of the first and second vapor streams between the first and second sections of the vapor chamber;

f. a generally horizontally axised, cylindrical, mechanically aided, wiped thin-film evaporator having an open upstream liquid feed end and a residue discharge outlet at the other downstream end, the evaporator comprising a jacketed process shell and a plurality of rotor blades therein to provide for a wiped film on the interior wall of the process shell, the horizontal axis of the wiped-film evaporator in substantial alignment with the horizontal axis of the first and second sections of the vapor chamber, the upstream liquid feed end of the cylindrical wiped film evaporator directly communicating with the second section of the vapor chamber, so that the second liquid stream from the second section of the vapor chamber is directed as a liquid feed stream into the upstream liquid feed end of the wiped film evaporator, and so that the vapor stream from the wiped thin-film evaporator moves countercurrent to the liquid feed stream, and is discharged axially into the interior of the second and first sections, respectively, of the vapor chamber, and a residue stream discharged from the residue outlet of the wiped-film evaporator;

g. a condenser extending within and at the downstream end of the first section of the vapor chamber with respect to vapor flow to provide a condensate distillate stream from the total vapor stream in the vapor chamber, which total vapor stream comprises the first and second vapor streams from the first and second-stage evaporators and the vapor stream from the wiped thin-film evaporator, the total vapor stream moving counter and rectilinearly to the liquid in the apparatus;

h. an entrainment separator between the condenser and the first section of the vapor chamber to prevent the passage of the liquid droplets in the total vapor stream therethrough; and i. vacuum means to provide a subatmospheric pressure within the multistage evaporator apparatus, thereby providing a compact multistage evaporator apparatus having a reduced pressure drop and the recovery of a condensate distillate from the outlet of the vapor chamber.

11. A low-pressure multistage evaporative process of separating volatile and nonvolatile components of a liquid feed stream, which process comprises:

a. evaporating a liquid feed stream in a first thin-film evaporator into first vapor and first liquid components;

b. discharging the first liquid and first vapor components directly into a common vapor space under subatmospheric pressure;

c. feeding the first liquid from the vapor space to the upstream end of a second rising thin-film evaporator;

d. evaporating the thus fed liquid into second vapor and second liquid components;

e. discharging the second liquid and second vapor from the downstream end of the second evaporator directly into said common vapor space;

f. preventing the admixing of the first and second liquid components in the said vapor space;

g. flowing the second liquid into the upstream feed end of a wiped thin-film evaporator;

h. evaporating the second liquid component in said wiped film evaporator into a residue component and a third vapor component;

i. discharging the residue component from the downstream end of the wiped thin-film evaporator;

j. discharging the third vapor component directly into said common vapor space without a change in direction of the third vapor component;

k. moving the first, second and third vapor streams countercurrent to the first and second liquid streams and rectilinearly within the said vapor chamber;

l. condensing into a distillate the admixture of first, second and third vapor components in the said vapor space at the downstream end thereof; and m. discharging the condensate distillate from said common vapor space at said end thereof.

12. The process of claim 11 wherein the liquid feed stream is a used hydrocarbon-lubricating oil, and the distillate is a hydrocarbon-lubricating oil having a boiling point range of from about 425° to 600°F.

13. The process of claim 11 wherein the vapor space is maintained under a subatmospheric pressure of from 0.01 to 100 mm pressure.

14. The process of claim 11 which includes deentraining liquid droplets from the combined first, second and third vapor components prior to condensing the vapor admixture.

15. The process of claim 11 wherein the liquid feed stream is a reaction mixture containing bis phenol A, and wherein the condensate distillate is a purified bis phenol A.

* * * * *